Patented Sept. 26, 1922.

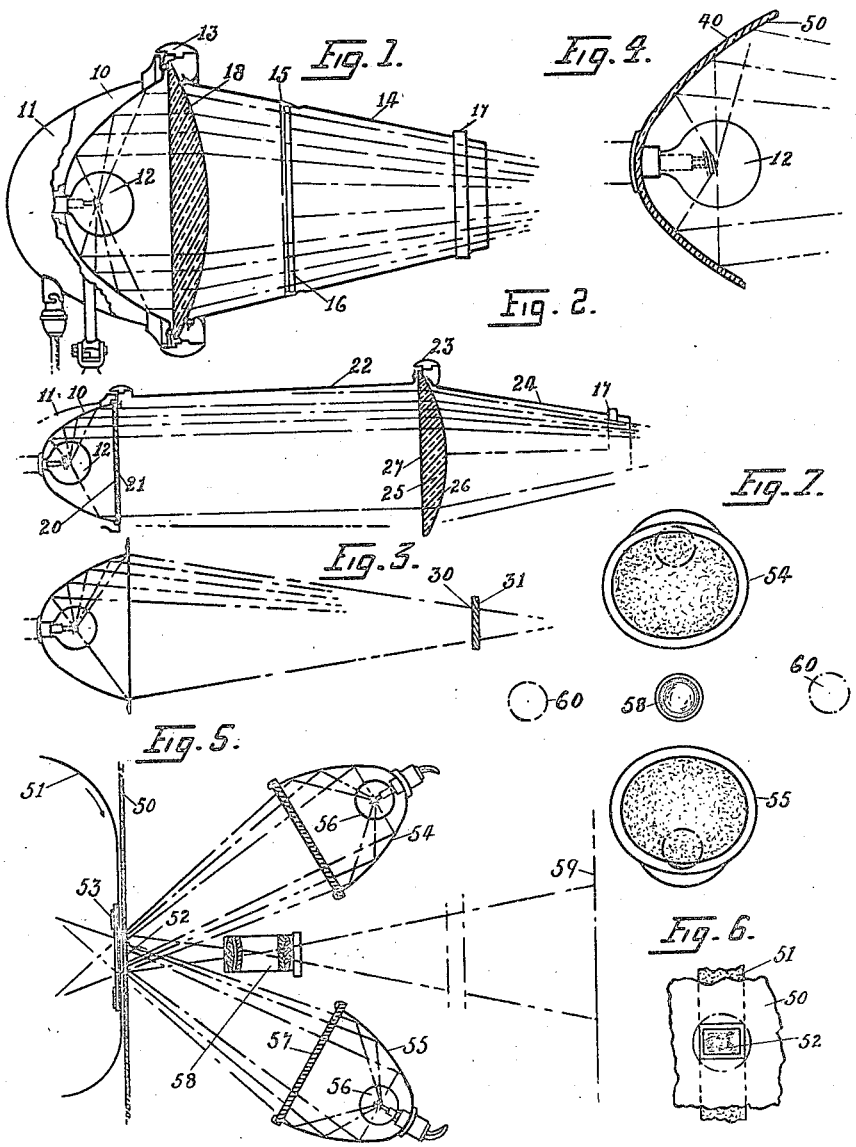

1,430,494

UNITED STATES PATENT OFFICE.

PERCY EDWARD CORRELL, OF SYDNEY, NEW SOUTH WALES, AUSTRALIA.

OPTICAL PROJECTION APPARATUS APPLICABLE PARTICULARLY TO OPTICAL PROJECTION LANTERNS, CINEMATOGRAPH PROJECTORS, AND THE LIKE.

Application filed January 6, 1922. Serial No. 527,484.

*To all whom it may concern:*

Be it known that PERCY EDWARD CORRELL, a subject of the King of Great Britain, residing at Kimo Flats, Phillip Street, Sydney, State of New South Wales, Commonwealth of Australia, has invented certain new and useful improvements in and relating to optical projection apparatus applicable particularly to optical projection lanterns, cinematograph projectors, and the like (for which I have filed an application in Australia July 30, 1920), of which the following is a specification.

This invention relates to optical projection apparatus and is applicable particularly to optical projection lanterns cinematograph projectors and the like. The invention has for its object to provide an improved apparatus of the kind indicated of which the efficiency is very great.

A further object of the invention is to provide an apparatus particularly adapted for the efficient projection of brilliant pictures from slides or "films" of paper or other opaque and comparatively inexpensive material, upon which the images or pictures to be projected may be printed photographically or in some cases by means of ink and without the employment of costly photographic salts and solutions.

A further object of the invention is to permit the use of sources of light of much lower candle-powers than have hitherto been used with apparatus as hitherto and commonly constructed and employed, thus reducing the costs attending projection, as a result of the more economical utilization of electric current, thereby enabling the comparatively inexpensive electric lamps or "bulbs" of the kind found in motor car headlamps, to be used in lieu of lamps specially designed and constructed for use in apparatus of the type to which the invention relates.

A further object of the invention is to obtain screen illumination free from irregularities, streakiness, and the like.

A still further object of the invention is to provide an improved projection apparatus of the type to which the invention relates of comparatively low initial and installation cost.

In this specification "screen" is used to mean any device or material employed to receive an image or picture; "lantern" and "projector" are intended to mean any apparatuses used for projecting such images or pictures; "image" and "picture" are intended each to mean any representation employed in any appropriate apparatus among those included within the specification; and "optical projection apparatus" is intended to mean any device or apparatus for the intensification and or concentration of light upon or for the intense illumination of a slide film or the like carrying a picture to be projected upon a "screen" or elsewhere.

The improved projection apparatus comprises as a feature thereof the combination of a "deep" type of reflector having a focal region "deep-set" therein, and a compact source of light positioned in the field of the said reflector and at or in the vicinity of the focal region thereof, so that a very large proportion of the light energy radiated from said source of light impinges upon the reflecting surface of said reflector being thereby concentrated, a comparatively small proportion only of the radiated light energy being permitted to escape uninfluenced by the reflector.

The improved apparatus may in some cases comprise in addition to the special combination of the source of light and the reflector having a "deep-set" focal region at or in the vicinity of which the source of light is positioned, a lens or combination of lenses upon which the concentrated or intensified light reflected from the reflector impinges and whereby convergence of such rays is produced or modified so as to effect the concentration or focusing of the said light at a suitably positioned outer focal region so as to illuminate a slide or film and to pass into and through an objective lens serving to effect the formation on a screen of an enlargement of an image carried by said slide or film.

The improved apparatus comprises also as a novel feature a member having a surface or surfaces thereof specially formed or prepared with a finely granulated, stippled or like and slightly light-diffused surface, which serves to clarify advantageously the light projected by the apparatus.

In the case of a glass surface, as for instance the surface of plano-convex or other lens, such surface is prepared preferably by etching with fluoric acid. To secure an efficient granulation, stippling or the like of the glass surface such surface is preferably first specially prepared by matteing heavily, by means of "white acid," or by frosting as by sand blasting or grinding, the matteing or frosting being subsequently very fully reduced or "cleared" by means of the fluoric acid, a finely granulated, stippled or like surface (exhibiting in some cases a satin-like sheen or like effect, sometimes termed a satin-surface) being thus obtained. An optically equivalent specially granulated and slightly light-diffusive surface may be obtained without preliminary matteing or frosting by the special action of fluoric acid used in conjunction with a material such as carborundum, fluor-spar or mica in the form of a powder of fine grade serving to render the "bite" of the acid more pronounced, thus modifying or enhancing the granulating stippling or like effect or action thereof so that a suitably granulated, stippled or like effect is thereby produced. Various degrees of slight light-diffusivity are thus and thereby obtainable; for instance in the case of the reduction of a previously frosted, sand blasted or ground glass the resultant degree of slight diffusivity depends on the extent to which the frosting, sand blasting or grinding is more or less completely reduced or "cleared." Variations in the strengths of fluoric acid used also effect the nature of the granulation produced and the degree of slight-diffusivity thereof. The requisite variations in the nature of the specially granulated, stippled or like surface produced by fluoric acid used in conjunction with the powdered carborundum, fluor-spar, mica or the like may be effected by the use of various grades of such powdered material.

In the case of a metallic surface, as for instance the surface of a metallic reflector, the special preparation of such surface is effected preferably by the corrosive or etching action of a solvent, such surface being thereby suitably slightly granulated or "nipped." Preliminary matteing, or preferably frosting, by sandblasting, grinding or otherwise may sometimes be effected on such surface prior to the action of the solvent or the like thereon or fine sand or the like may be employed in conjunction with acid or other corrosive or etching medium or media in the preparation and formation of such metallic surface, such for instance as surfaces of brass or copper, for the preparation of which nitric or other acids may be used.

In the case of a metallic reflector having a plating of highly light-reflective metal (for instance silver) the surface of the underlying metal may be specially prepared and formed by "nipping" with acid or other corrosive medium with the finely granulated, stippled or like and slightly light-diffusive surface and the highly light-reflective material subsequently super-deposited by electro-plating thereupon, the electro-plating being duly enlivened in accordance with practice well known in the electro-platers' art. The reflecting surface thus prepared exhibits a satin-like "sheen" or similar effect.

In the case of a silvered glass reflector, lens-mirror or specially provided light-clarifying member, the glass surface of such may be specially prepared by etching with fluoric acid prior to the deposition thereupon of the silver.

The light-clarifying member may take the form of a sheet of plate-glass having a surface thereof specially prepared with the satin-surface, embossed stippled surface, or other optically equivalent slightly light-diffusive surface as heretofore described; and such sheet of plate-glass may be positioned in some cases closely to and in other cases more or less distantly from the reflector or such lens or lens-combination as may be comprised in the improved apparatus; and it may be positioned in some cases either in front of or behind such lens or lens-combination, or between lenses of such a lens-combination; it being positioned in all cases so that the light projected from the improved apparatus is transmitted thereby, being thereby effectively clarified.

The action of the granulated, stippled or like and slightly light-diffusive surface or surfaces is to clarify the light projected thereby. The specially prepared surface thereby does not cause any great deconcentration of light as would an ordinary frosted surface.

The specially prepared surfaces herein described have diffusive effects very dissimilar in the degree or order thereof from the diffusive effects of ordinary unmodified frosted surfaces secured by sandblasting or grinding, the surfaces required for the successful practice of this invention being by no means ordinary unmodified frosted surfaces, such being now and hereby disclaimed as altogether unsuitable for the purposes of the invention.

In order that the nature of and manner of performing the invention may be still more clearly understood, exemplary and illustrative embodiments and applications thereof will now be described, with reference to the accompanying drawing wherein:—

Figure 1 is a diagrammatic view of the improvement;

Figures 2, 3 and 4 are similar views of modifications;

Figure 5 is a further modification, showing a plurality of projectors, a lens cell and a portion of the box and strip carrying the matter to be displayed;

Figure 6 is a detail rear view of the box and strip; and

Figure 7 is a rear end view of two projectors and lens cell similar to those of Figure 5 and showing in dotted lines two additional projectors.

Referring to Figure 1, 10 is the paraboloid reflector, 11 a container case therefor, 12 an electric lamp, preferably of the type in which a curled filament is used and the source of light is located as nearly as possible about the focal centre of the reflector 10. 18 is a plano-convex lens fitted in the bezel 13 in front of the reflector 10. 14 is a tapered tubular casing set forward of the lens 18, and 15 is a sheet of clear glass fixed in the casing 14. The heavy line 16 on one side of the glass sheet 15 indicates the surface thereof granulated or stippled according to the method described herein. 17 is a slide way in which a lantern slide may be placed when the apparatus is used for projections from a slide.

In Figure 2, 10 is a paraboloid reflector and 12 an electric lamp. In this case a beam of substantially parallel rays which are caused to pass through a glass plate 20 one surface 21 of which is granulated or stippled is arranged in front of the lamp. The glass plate 20 is carried in the bezel of the lamp, said bezel also forming a means of support or attachment for the tubular casing 22. Another bezel fitting 23 on said casing supports the base end of the tapered tubular casing 24 and forms a mount for the converging lens 25. The convex surface 26 of this lens, or its plane surface 27, may be granulated or stippled, or the lens faces may be left clear. It is in practice found of some importance to locate the lens 25 in this arrangement at a considerable distance from the plate 20. The distance between these elements should be more than the diameter of the lens 25, better equalization of the intensity throughout the field of the emerging beam being obtained as the distance between the plate 20 and the lens 25 is extended.

In Figure 3 the reflector is elliptical and throws a convergent beam of rays. 30 is a glass plate having one of its surfaces 31, preferably the forward surface, granulated or stippled. The convergent rays passing through the plate surface 31 are as in the cases before described, slightly refracted irregularly about their normal line of direction so that equalization of the intensity of the beam is procured over its field.

In Figure 4 the granulated or stippled surface is produced on the reflector. 40 is the shell or body of the reflector, and the heavy line 50 represents the granulated or stippled surface of the metal or glass shell 40, said surface being finally silver-plated and polished. The reflector here shown is of the elliptical type for delivering convergent rays. Throughout the drawings, the rays are indicated by long dotted lines.

In Figure 5 a plurality of projectors is assembled in conical order in relation to a surface in front of which a projector lens cell is positioned. This is an arrangement used for the screening of pictorial or other matter from opaque prints on the principle of the well known reflector projector lantern. 50 represents a face plate on a box containing any form of spool arrangement (not shown) adapted to carry a strip 51 of paper or other fabric on the surface of which printed or painted matter is displayed. The strip 51 is to be moved step-by-step by any suitable means to bring the respective panels of pictorial or other matter thereon to register with an aperture 52 in the plate 50. See Figure 6. 53 is a backing frame in rear of the strip 51 for guiding and maintains it in flat condition whilst it is displayed through the aperture 52. A card slide may be substituted for the strip guide. 54—55 are two convergent reflectors, each of which carries a glass plate 57, one or other surface of which (indicated by a heavy line) is granulated or stippled. 58 is a projector lens cell. 59 represents the screen on which the matter contained on the strip 51 is displayed enlarged.

Instead of two lamps as shown in Figure 5 four lamps may be used as shown in Figure 7. In this view the additional lamps are indicated by the circles 60 representing the centres of two lamps similar to the lamps 54 and 55 which, like them are arranged with their lens axis directed toward conjugate focal points on a plane rearward of the exposed surface of the strip 51. It will be understood that any desired number of lamps may be arranged in conical disposition about the aperture 52, so that the beams from each of them respectively will be concentrated on the exposed portion of the strip 51 so as to fully illuminate it. Rays reflected from the illuminated surface exposed in the aperture 52 are then transmitted in the well known manner through the lens cell 58 to the screen 59.

It is to be understood that the lamps shown in Figures 5 and 7 may be lamps constructed and fitted with lenses or plates granulated or stippled and described with reference to Figures 1 to 4. The uniform distribution of light and the great concentration of light on the exposure obtained by this arrangement provides a quite effective means for displaying pictures or other matter on a screen from opaque prints. While heretofore such a result has been known the lack of clarity of the screened picture and the low illumination of it have precluded the use of the reflector lantern for most display purposes. The arrangement shown, however, has proved in practice to be quite efficient for the display of printed matter on a screen by reflection, provided, of course, that the length of throw is not excessive.

I claim:—

1. In an apparatus of the character described, a paraboloid reflector, a light located about the focus of the reflector, a converging lens in front of the reflector, said lens having one face granulated or stippled to produce slight diffusion.

2. In an apparatus of the character specified, a paraboloid reflector, an electric light located about the focus of the reflector, a converging lens in front of the reflector, and a translucent plate in the rear of the lens, said plate having one face granulated or stippled to produce slight diffusion.

3. In an apparatus of the character described, in combination, a paraboloid reflector, a source of light located about the focus of said reflector, a translucent plate in front of the reflector, said plate having one of its surfaces granulated or stippled for slightly and irregularly refracting rays of light passing therethrough and thereby equalizing the distribution of light rays in the beam, and a converging lens located in the path of the emitted beam at a distance from said plate, greater than the lens diameter.

4. In an apparatus of the character described, a paraboloid reflector, a tubular casing extending forwardly therefrom, a light located at the approximate focal center of the reflector, a converging lens held in the casing in front of the reflector and adapted to converge the parallel beams of reflected light, and a plate held in said casing in rear of the lens, said plate having a slightly light diffusive face, as and for the purpose set forth.

5. In an apparatus of the character described, a paraboloid reflector, an electric light located about the focus of the reflector, a plano-convex lens in front of the reflector, and a translucent plate in the rear of the lens, the plate and lens each having one face granulated or stippled.

6. In an apparatus of the character described, a paraboloid reflector, an electric light located about the focus of the reflector, a converging lens in front of the reflector, and a translucent plate in the rear of the lens, the plate and lens each having one face granulated or stippled to produce slight diffusion.

7. In an apparatus of the character described a curved reflector, a light located about the focus thereof, a translucent plate having a granulated or stippled surface and mounted at the front of said reflector, a tubular casing extending forwardly from the reflector and in front of said plate, and a converging lens held in said casing in front of said plate and at a distance therefrom greater than the diameter of the lens.

In testimony whereof, I have signed my name to this specification in the presence of two subscribing witnesses.

PERCY EDWARD CORRELL.

Witnesses:
CHARLES N. CALLISON,
DAISY WILLIAMS.